(12) United States Patent
Tarkiainen et al.

(10) Patent No.: US 11,429,074 B2
(45) Date of Patent: Aug. 30, 2022

(54) METHOD AND A CONTROL SYSTEM FOR CONTROLLING PARALLEL OPERATING DEVICES

(71) Applicant: Danfoss Editron Oy, Lappeenranta (FI)

(72) Inventors: Antti Tarkiainen, Lappeenranta (FI); Risto Tiainen, Pulp (FI); Matti Iskanius, Lappeenranta (FI)

(73) Assignee: Danfoss Editron Oy, Lappeenranta (FI)

( * ) Notice: Subject to any disclaimer, the term of this patent is extended or adjusted under 35 U.S.C. 154(b) by 111 days.

(21) Appl. No.: 16/963,966

(22) PCT Filed: Jan. 21, 2019

(86) PCT No.: PCT/EP2019/051328
§ 371 (c)(1),
(2) Date: Jul. 22, 2020

(87) PCT Pub. No.: WO2019/145243
PCT Pub. Date: Aug. 1, 2019

(65) Prior Publication Data
US 2021/0041842 A1    Feb. 11, 2021

(30) Foreign Application Priority Data
Jan. 26, 2018    (EP) .................................... 18153565

(51) Int. Cl.
*G05B 19/042*    (2006.01)

(52) U.S. Cl.
CPC .. *G05B 19/042* (2013.01); *G05B 2219/23217* (2013.01)

(58) Field of Classification Search
USPC ......................................................... 700/28
See application file for complete search history.

(56) References Cited

U.S. PATENT DOCUMENTS 5,559,415 A * 9/1996 Gregory ............... G05D 1/0061
318/609
5,627,745 A * 5/1997 Flood ................... G05B 19/042
700/2

(Continued)

FOREIGN PATENT DOCUMENTS

CN          105484886 A       4/2016

OTHER PUBLICATIONS

International Search Report For Serial No. PCT/EP2019/051328 dated May 16, 2019.

*Primary Examiner* — Mohammad Ali
*Assistant Examiner* — Joshua T Sanders
(74) *Attorney, Agent, or Firm* — McCormick, Paulding & Huber PLLC (57) ABSTRACT

A device-system comprises parallel operating devices (105-107) for driving an operating quantity towards a target value, and a control system for controlling each device at least partly based on a device-specific integral term relating to a time integral of a device-specific error signal that is indicative of a deviation of the operating quantity from the target value. The control system comprises a stabilizing system that computes an arithmetic average of the device-specific integral terms and corrects the device-specific integral terms towards the computed arithmetic average. The correction of the device-specific integral terms makes it possible to avoid unwanted drifts in the device-specific integral terms in a situation where there are differences between the device-specific error signals. The devices can be peers to each other and thus redundancy is achieved because one device can be removed from or added to the device-system without actions from the other devices.

14 Claims, 5 Drawing Sheets

(56) References Cited

U.S. PATENT DOCUMENTS

| | | | | |
|---|---|---|---|---|
| 2009/0244945 A1* | 10/2009 | Hatanaka | ............... | H02M 7/23 |
| | | | | 363/127 |
| 2009/0248177 A1* | 10/2009 | Rifai | ..................... | G05B 11/36 |
| | | | | 700/45 |
| 2016/0352250 A1* | 12/2016 | Lee | ...................... | H02M 7/493 |
| 2019/0155255 A1* | 5/2019 | Becerra | .............. | H02P 23/0077 |

* cited by examiner

METHOD AND A CONTROL SYSTEM FOR CONTROLLING PARALLEL OPERATING DEVICES

CROSS-REFERENCE TO RELATED APPLICATION

This application is a National Stage application of International Patent Application No. PCT/EP2019/051328, filed on Jan. 21, 2019, which claims priority to European Patent Application No. 18153565.9 filed on Jan. 26, 2018, each of which is hereby incorporated by reference in its entirety.

TECHNICAL FIELD

The disclosure relates generally to control of parallel operating devices configured to drive a common operating quantity towards a target value. More particularly, the disclosure relates to a control system and to a method for controlling parallel operating devices, and to a computer program for stabilizing a control of parallel operating devices.

BACKGROUND

In many cases, there is a need to control parallel operating devices which are configured to drive a common operating quantity towards a target value. The parallel operating devices can be, for example but not necessarily, mechanically coupled motors whose rotational speeds have fixed relations with respect to each other. A mechanical coupling between motors can be for example a rigid coupler arranged to couple the shafts of the motors together, a gear arranged to couple the shafts of the motors together with a given gear ratio, or a chain or a belt between the shafts of the motors. It is also possible that motors are connected to wheels that are coupled through the ground or a rail. In cases of the kind mentioned above, the above-mentioned common operating quantity can be for example speed of a vehicle comprising the motors or rotational speed of an actuator driven by the motors. For another example, an electric machine with multiple windings driven by separate inverters can be seen to represent multiple mechanically connected electric machines. Each individual winding is, from the viewpoint of control, a single electric machine and the common rotor is making the mechanical coupling. For a further example, the parallel operating devices can be electric power converters connected to a common direct voltage link. In this exemplifying case, the operating quantity is the direct voltage of the common direct voltage link.

A standard way to control an operating quantity, e.g. speed, is to form an error value by subtracting a measured or estimated value of the operating quantity from a reference value, and to use a proportional and integrating "PI" controller to drive an operating state of a controlled device, e.g. torque of a motor, to a direction that reduces the error value. A control principle of the kind mentioned above does not work satisfactorily if e.g. several speed controlled motors are mechanically coupled. The reason is that, due to the integral action, the PI-controller has an infinitely large gain at the zero frequency. Therefore, if two controllers controlling mechanically coupled motors see the rotational speed of the motors slightly differently, no matter how little, they will use all the available control force, which here is the torque, to correct the error. The result is that one controller is trying to increase the rotational speed while the other tries to decrease the rotational speed and both will increase their control force as much as possible. This is a well-known problem of parallel operating devices, such as e.g. parallel connected speed controlled motors, which are configured to drive a common operating quantity to a target value.

A common way to alleviate the above-described problem is to use a master-slave configuration. In the master-slave configuration of mechanically coupled motors, one of the motors acts as a master unit and has a speed controller and the other motors act as slave units and have torque controllers. A torque reference determined by the master unit is communicated to the slave units via some communication medium, such as e.g. a field bus. The slave units are driven in a torque control mode and fulfill the torque reference determined by the master unit. A master-slave configuration of the kind described above is however not free from challenges. The units need to be configured differently, one of them must be configured as a master and the others as slaves. This adds burden to the commissioning phase and particularly to the field service operations and spare part management. If a unit is needed to be replaced or modified, the personnel need to know which unit is the master and which are slaves and they need to be able to configure the units accordingly. More importantly, in many cases the system must be redundant so that if one of the units becomes inoperable, the system must continue operation with the remaining units with reduced power. This brings a requirement to assign the master role dynamically without a human intervention and, in most difficult cases, even without stopping the speed control of a driven load. The dynamical role-shifting requirement adds considerable complexity to the system and is generally wanted to avoid.

Another common way to alleviate the above-described problem of parallel operating controllers is drooping that is a feedback from a controller output to a reference signal. The amount of drooping is set with a drooping rate parameter which can be e.g. 5%, meaning that when control force, which can be e.g. torque, increases to its full value, a reference value, e.g. speed reference, is lowered by 5%-points. This makes it possible for the parallel connected devices to reach a consensus even though the controllers of the devices may perceive differences in measured or estimated operating quantity, e.g. speed. When e.g. a speed controller senses a speed difference, it tries to correct it by increasing torque. But if the actual speed does not change due to parallel connected drives not letting it to, the droop action still lowers the error signal by changing the speed reference. Thus, even though speed cannot change, the speed controller error signal can go to zero due to the drooping. The inherent drawback of the drooping is that the control is not accurate but affected by the drooping. For example, with a 5% drooping rate, an electric machine with 2000 rpm nominal speed reference will run 1900 rpm at full motoring torque and 2100 rpm at full generating torque. Some sensitive applications may not perform acceptably with such a speed error.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new control system for controlling parallel operating devices that are configured to drive an operating quantity towards a target value. The parallel operating devices can be, for example but not necessarily, mechanically coupled electric machines whose rotational speeds have fixed relations with respect to each other. In this exemplifying case, the operating quantity has a fixed relation with the rotational speeds of the electric machines and the operating quantity can be e.g. speed of a vehicle comprising the electric machines or rotational speed of an actuator driven by the electric machines. As a special case, an electric machine with multiple windings driven by separate inverters can be seen to represent multiple mechanically connected electric machines. Each individual winding represents a single electric machine and the common rotor is making the mechanical coupling. It is also possible that the parallel operating devices are mechanically coupled combustion engines. For a further example, the parallel operating devices can be electric power converters supplying a common direct voltage link. In this exemplifying case, the operating quantity is direct voltage of the common direct voltage link.

A control system according to the invention comprises:
  controllers for controlling the devices so that each controller is configured to control one of the devices at least partly based on a device-specific integral term maintained by the controller under consideration and relating to a time integral of a device-specific error signal available to the controller and indicative of a deviation of the operating quantity from the target value, and
  a stabilizing system for computing, for each of the controllers, an arithmetic average of (i) the device-specific integral term maintained by the controller under consideration and (ii) one or more of the device-specific integral terms maintained by other ones of the controllers, and for correcting the device-specific integral term maintained by the controller under consideration towards the computed arithmetic average.

The correction of the device-specific integral terms makes it possible to avoid unwanted drifts in the device-specific integral terms in a situation where there are slight differences between the device-specific error signals.

The devices can be peers to each other and thus redundancy is achieved because one device can be removed from or added to the system without actions from the other devices. If a device is removed, its device-specific integral term does not participate to the average calculation anymore. On the other hand, if a device is added its device-specific integral term can be added automatically to the average calculation.

In accordance with the invention, there is provided also a new device-system that comprises:
  parallel operating devices for driving an operating quantity towards a target value, and
  a control system according to the invention for controlling the parallel operating devices.

In accordance with the invention, there is provided also a new controller for controlling a device that is one of parallel operating devices configured to drive an operating quantity towards a target value.

A controller according to the invention comprises:
  a control section for controlling the device at least partly based on a device-specific integral term maintained by the control section and relating to a time integral of a device-specific error signal available to the controller and indicative of a deviation of the operating quantity from the target value,
  a receiver for receiving one or more of device-specific integral terms related to other ones of the parallel operating devices, and
  an arithmetic section for computing an arithmetic average of (i) the received device-specific integral terms and (ii) the device-specific integral term maintained by the control section, and for correcting the device-specific integral term maintained by the control section towards the computed arithmetic average.

In accordance with the invention, there is provided also a new method for controlling parallel operating devices configured to drive an operating quantity towards a target value. A method according to the invention comprises:
  controlling each of the devices at least partly based on a device-specific integral term relating to a time integral of a device-specific error signal indicative of a deviation of the operating quantity from the target value.

The method further comprises the following actions for each of the devices:
  computing an arithmetic average of (i) the device-specific integral term related to the device under consideration and (ii) one or more of the device-specific integral terms related to other ones of the devices, and
  correcting the device-specific integral term related to the device under consideration towards the computed arithmetic average.

In accordance with the invention, there is provided also a new computer program for stabilizing control of parallel operating devices configured to drive an operating quantity towards a target value, each of the devices being controlled at least partly based on a device-specific integral term relating to a time integral of a device-specific error signal indicative of a deviation of the operating quantity from the target value. A computer program according to the invention comprises computer executable instructions for controlling a programmable processing system to:
  compute, for each of the devices, an arithmetic average of (i) the device-specific integral term related to the device under consideration and (ii) one or more of the device-specific integral terms related to other ones of the devices, and
  correct the device-specific integral term related to the device under consideration towards the computed arithmetic average.

In accordance with the invention, there is provided also a new computer program product. The computer program product comprises a non-volatile computer readable medium, e.g. a compact disc "CD", encoded with a computer program according to the invention.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DETAILED DESCRIPTION

The specific examples provided in the description below should not be construed as limiting the scope and/or the applicability of the accompanied claims. Lists and groups of examples provided in the description are not exhaustive unless otherwise explicitly stated.

Figure 1A:
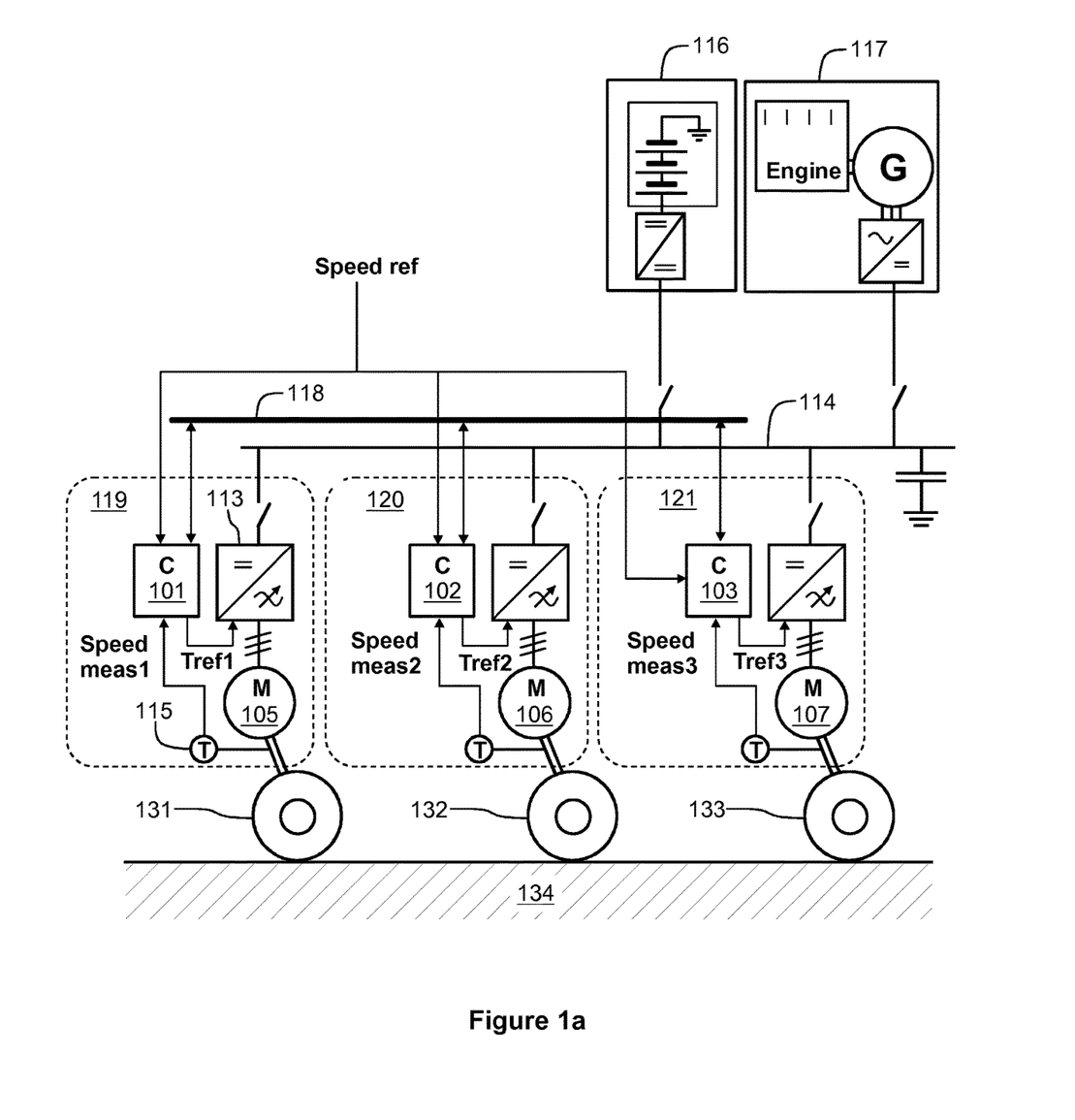
FIG. 1a illustrates a device-system according to an exemplifying and non-limiting embodiment of the invention.

FIG. 1a shows a schematic illustration of a device-system according to an exemplifying and non-limiting embodiment of the invention. The device-system comprises parallel operating devices for driving an operating quantity towards a target value. In this exemplifying case, the parallel operating devices are electric machines 105, 106, and 107 for driving wheels 131, 132, and 133. The rotational speeds of the electric machines 105, 106, and 107 are coupled to each other via the ground 134. In this exemplifying case, the above-mentioned operating quantity is the rotational speed of the electric machines 105-107 and the above-mentioned target value is a speed reference. In FIG. 1a, the speed reference is denoted as Speed ref. In the exemplifying device-system shown in FIG. 1a, the electric machines 105-107 are driven with electric power converters which are connected to a common direct voltage link 114. It is, however, also possible that there are other means for driving the electric machines. In FIG. 1a, the electric power converter driving the electric machine 105 is denoted with a reference 113. In the exemplifying device-system shown in FIG. 1a, the direct voltage link 114 is connected to a battery unit 116 and to an engine-generator unit 117. Thus, the device-system illustrated in FIG. 1a can be for example a part of a hybrid vehicle. It is, however, also possible that there are other means for supplying electric energy to the direct voltage link 114. Each of the electric machines 105-107 is provided with a tachometer for measuring the rotational speed the electric machine under consideration. In FIG. 1a, the measured values of the rotational speed are denoted as Speed meas1, Speed meas2, and Speed meas3. Each of the electric machines 105-107 is provided with an own tachometer to achieve redundancy. In FIG. 1a, the tachometer connected to the electric machine 105 and configured to measure the rotational speed of the electric machine 105 is denoted with a reference 115.

The device-system comprises a control system according to an exemplifying and non-limiting embodiment of the invention for controlling the electric machines 105-107 via the electric power converters. The control system comprises controllers 101, 102, and 103 for controlling the electric machines 105-107 based on the speed reference Speed ref and on the measured rotational speed values Speed meas1, Speed meas2, and Speed meas3. Each controller is configured to produce a torque reference that is delivered to the respective electric power converter. In FIG. 1a, the torque references produced by the controllers 105-107 are denoted with Tref1, Tref2, and Tref3. Each of the controllers 105-107 is configured to control the respective electric machine at least partly based on a device-specific integral term maintained by the controller under consideration and relating to a time integral of a device-specific error signal that is indicative of a deviation of the measured speed from the speed reference. For example, the device-specific error signal related to the electric machine 105 is: Speed ref-Speed meas1. In the exemplifying case illustrated in FIG. 1a, the "device-specific" means "machine-specific" since the parallel operating devices are the electric machines 105-107. The control system further comprises a stabilizing system for computing, for each of the controllers 105-107, an arithmetic average of (i) the device-specific integral term maintained by the controller under consideration and (ii) one or more of the device-specific integral terms maintained by the other ones of the controllers. Furthermore, the stabilizing system is configured to correct the device-specific integral term maintained by the controller under consideration towards the computed arithmetic average.

Figure 1B:
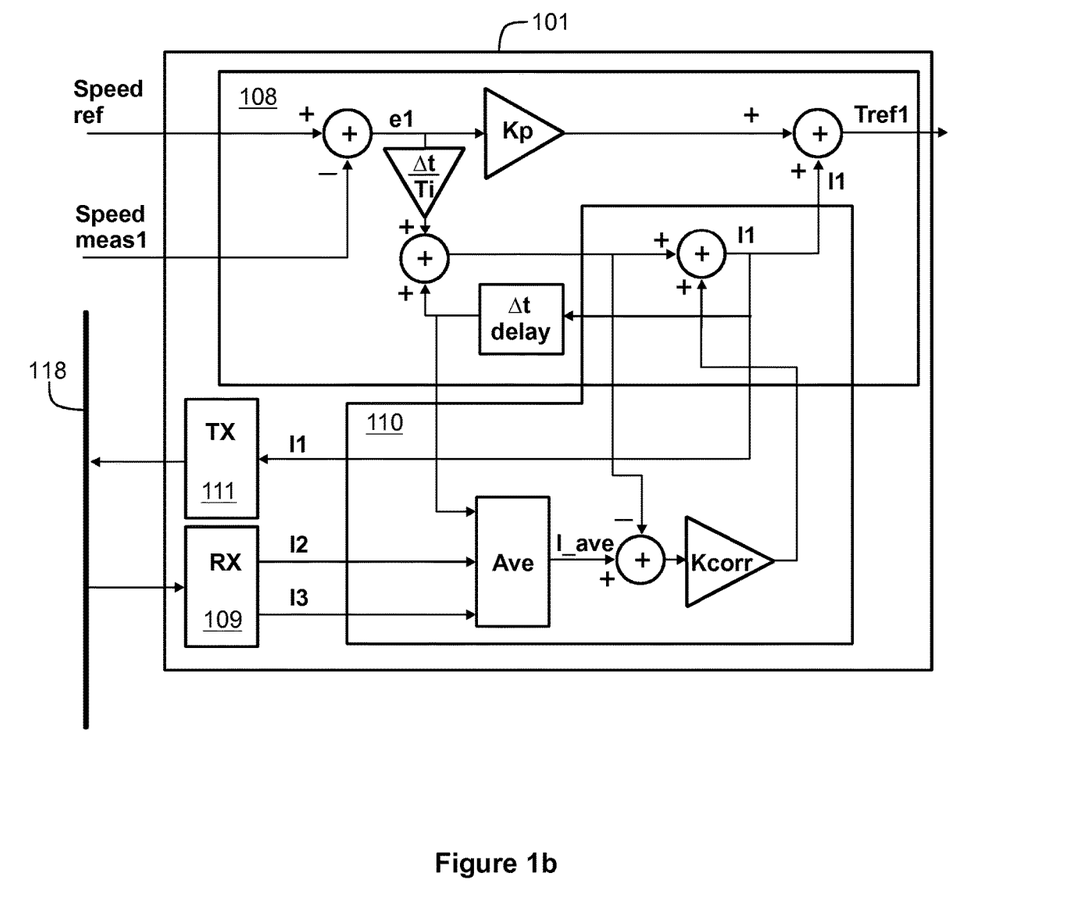
FIG. 1b illustrates a controller according to an exemplifying and non-limiting embodiment of the invention.

In the exemplifying control system illustrated in FIG. 1a, the above-mentioned stabilizing system is implemented in a distributed way so that the controllers 105-107 are communicatively connected to each other via a data transfer channel 118 e.g. a field bus, and each of the controllers 105-107 comprises means for correcting the device-specific integral term maintained by the controller under consideration. FIG. 1b shows a block-diagram of the controller 101. The controllers 102 and 103 can be similar to the controller 101. In FIG. 1b, the device-specific integral terms related to the electric machines 105-107 are denoted as I1, I2, and I3, respectively. The controller 101 comprises a receiver 109 for receiving the device-specific integral terms I2 and I3 maintained by the controllers 102 and 103. The controller 101 comprises a control section 108 for controlling the electric machine 105 at least partly based on the device-specific integral term I1 maintained by the control section 108. The integral term I1 relates to a time integral of the device-specific error signal e1 that is indicative of the deviation of the measured speed value Speed meas1 from the speed reference Speed ref, i.e. e1=Speed ref −Speed meas1. In this exemplifying case, the control section 108 constitutes a proportional and integrative "PI" controller. It is also possible that the control section 108 constitutes a proportional-integrative-derivative "PID" controller or another suitable controller mechanism. The controller 101 comprises an arithmetic section 110 for computing an arithmetic average I_ave of the received device-specific integral terms I2 and I3 and the device-specific integral term I1 maintained by the control section 108, i.e. I_ave=(I1+I2+I3)/3. The arithmetic section 110 is configured to correct the device-specific integral term I1 towards the computed arithmetic average I_ave. In the exemplifying case illustrated in FIG. 1b, the control section 108 and the arithmetic section 110 are configured to update and correct the device-specific integral term I1 according to the following formula:

$$I1 = I1,\text{prev} + e1\Delta t/Ti + K\ \text{corr}(I\_\text{ave} - (I1,\text{prev} + e1\Delta t/Ti)), \quad (1)$$

where I1,prev is the previous value of the device-specific integral term I1, Δt is the temporal length of one operating clock cycle, Ti is the integration time, and Kcorr is a correction factor. In typical cases the above-described correction is capable of compensating for small imbalances, and advantageously the correction is tuned to slower than the integration time Ti. For example, if the integration time Ti is 100 ms, the time constant of the correction could be about 1 s, which means a compensation factor Kcorr=1.0.

Figure 1C:
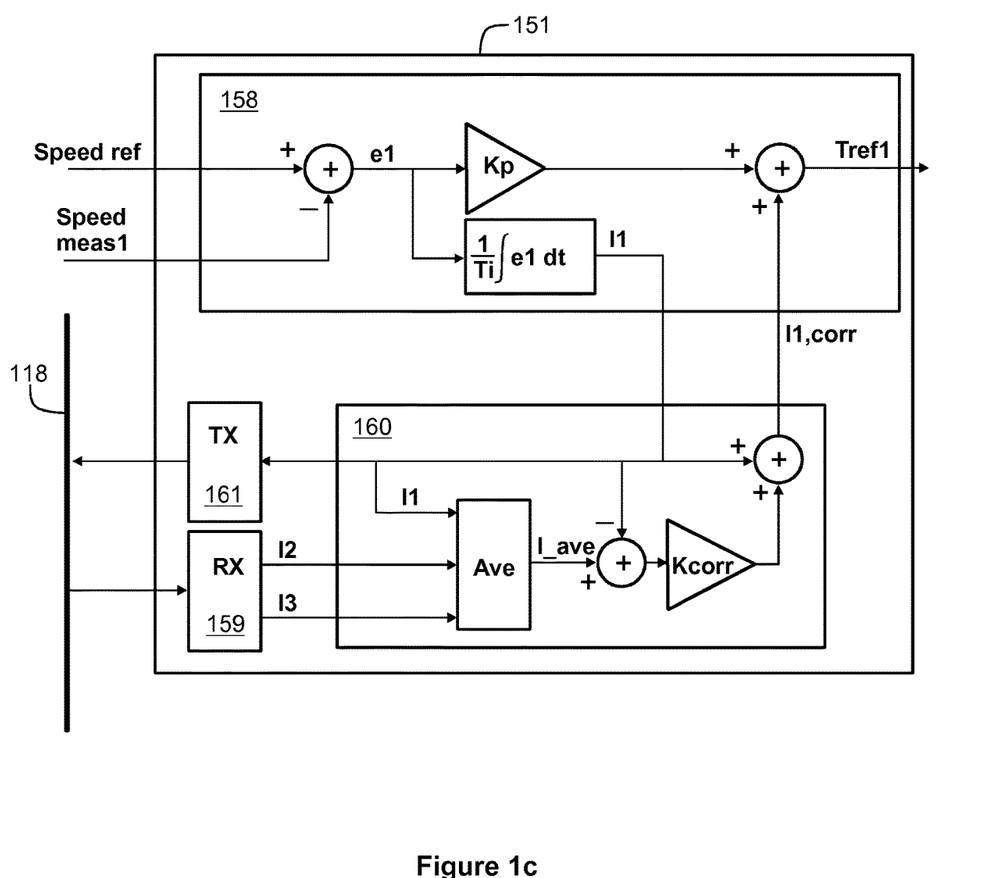
FIG. 1c illustrates a controller according to another exemplifying and non-limiting embodiment of the invention.

In a device-system according to another exemplifying and non-limiting embodiment of the invention, each of the controllers 101, 102, and 103 shown in FIG. 1a is like a controller 151 illustrated in FIG. 1c. In FIG. 1c, the device-specific integral terms related to the electric machines 105-107 are denoted as I1, I2, and I3, respectively. The controller 151 comprises a receiver 159 for receiving the device-specific integral terms I2 and I3 maintained by the other controllers. The controller 151 comprises a control section 158 for controlling the respective electric machine at least partly based on the device-specific integral term I1 maintained by the control section 158. The integral term I1 represents a time integral of the device-specific error signal e1 that is indicative of the deviation of the measured speed value Speed meas1 from the speed reference Speed ref, i.e. e1=Speed ref −Speed meas1. In this exemplifying case, the control section 158 constitutes a proportional and integrative "PI" controller. It is also possible that the control section 158 constitutes a proportional-integrative-derivative "PID" controller or another suitable controller mechanism. The controller 151 comprises an arithmetic section 160 for computing an arithmetic average I_ave of the received device-specific integral terms I2 and I3 and the device-specific integral term I1 maintained by the control section 158, i.e. I_ave=(I1+I2+I3)/3. The arithmetic section 160 is configured to correct the device-specific integral term I1 towards the computed arithmetic average I_ave. In the exemplifying case illustrated in FIG. 1c, the arithmetic section 160 is configured to correct the device-specific integral term I1 according to the following formula:

$$I1,\text{corr}=I1+K\text{ corr}(I\_ave-I1), \quad (2)$$

where I1,corr is the corrected value of the device-specific integral term I1, and Kcorr is a correction factor.

As illustrated with the exemplifying cases shown in FIGS. 1b and 1c, the device-specific integral terms can be corrected towards the average of the device-specific integral terms in various ways. The invention described in the present application is not limited to any particular way to correct the device-specific integral terms towards the average.

In the exemplifying case illustrated in FIG. 1b, the controller 101 comprises a transmitter 111 for transmitting, to the data transfer channel 118, the device-specific integral term I1 maintained by the control section 108. Correspondingly, in the exemplifying case illustrated in FIG. 1c, the controller 151 comprises a transmitter 161 for transmitting the device-specific integral term maintained by the control section 158. In some exemplifying and non-limiting embodiments, it is not necessary for every controller to transmit its own device-specific integral term to other controllers. If a controller only receives the device-specific integral terms from the other controllers, the controller can adapt its own device-specific integral term according to the device-specific integral terms of the other controllers. In some exemplifying embodiments, this kind of a listen-only mode may be advantageous because many controllers can be arranged to listen only one broadcast signal without the need to transmit anything. In the exemplifying case illustrated in FIG. 1a, for example the controller 103 could be in the above-described listen only mode where the controller 103 only receives the device-specific integral terms from the controllers 101 and 102 but does not transmits its own device-specific integral term.

In the device-system shown in FIG. 1a, the electric motors 105-107, the electric power converters, and the controllers 101-103 constitute units 119, 120, and 121 which can be peers to each other and thus redundancy is achieved because one of the units 119-121 can be removed from the device-system without actions from the other units. Correspondingly, a new unit can be added to the device-system without actions from the other units. If a unit is removed, its device-specific integral term does not participate to the above-described average calculation anymore. Correspondingly, if a unit is added its device-specific integral term can be added automatically to the average calculation.

Figure 2:
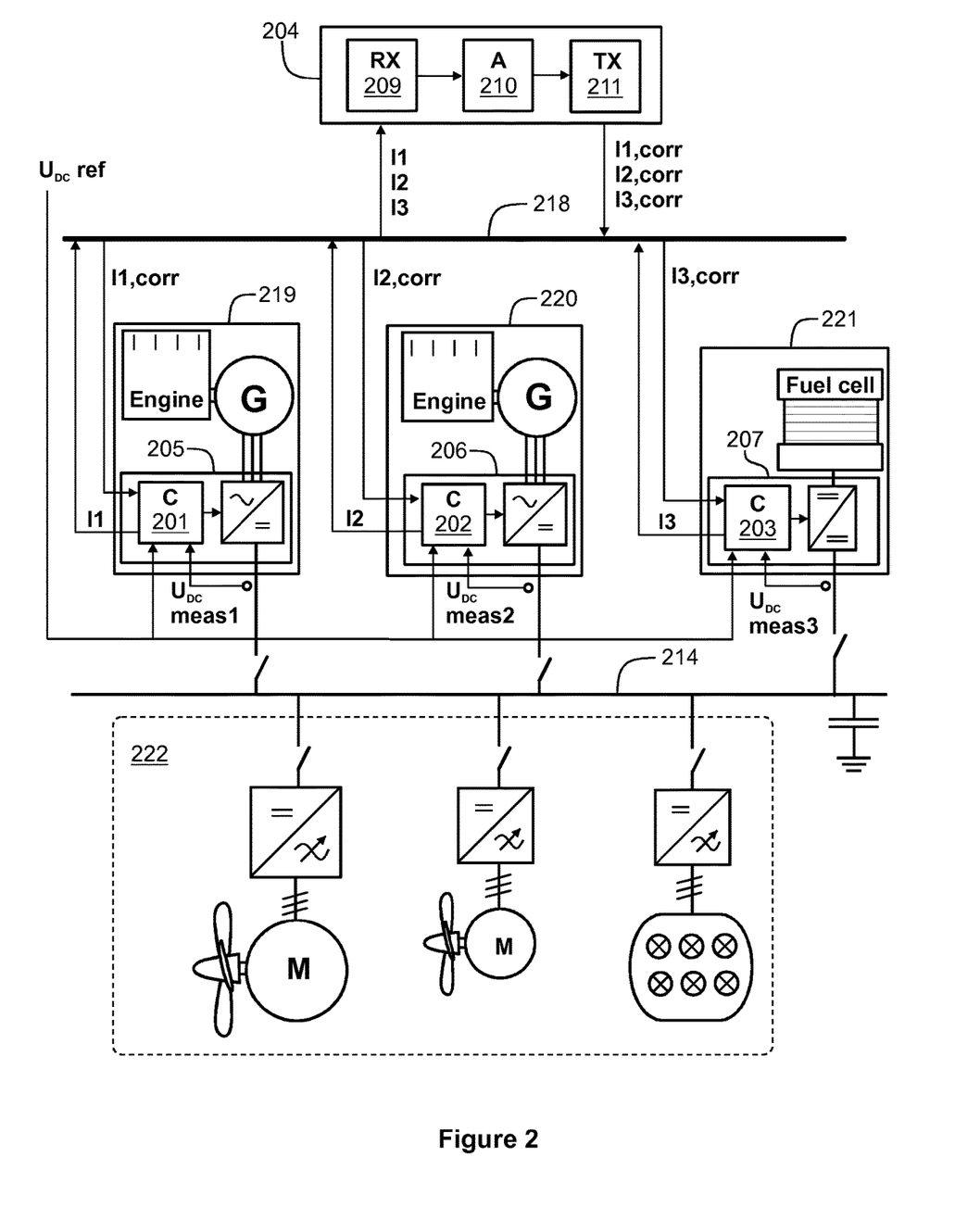
FIG. 2 illustrates a device-system according to an exemplifying and non-limiting embodiment of the invention.

FIG. 2 shows a schematic illustration of a device-system according to an exemplifying and non-limiting embodiment of the invention. The device-system comprises parallel operating devices for driving an operating quantity towards a target value. In this exemplifying case, the parallel operating devices are electric power converters 205, 206, and 207 connected to a common direct voltage link 214. The above-mentioned operating quantity is the direct voltage of the direct voltage link 214 and the above-mentioned target value is a voltage reference. In FIG. 2, the voltage reference is denoted as $U_{DC}$ ref. In the exemplifying device-system shown in FIG. 2, the electric power converters 205, 206, and 207 are parts of units 219, 220, and 221 configured to supply electric energy to the direct voltage link 214 which, in turn, is configured to supply electric energy to a load system 222. The device-system illustrated in FIG. 2 can be for example a part of an electric power system of a ship or a ferry.

The device-system comprises a control system according to an exemplifying and non-limiting embodiment of the invention for controlling the electric power converters 205-207. The control system comprises controllers 201, 202, and 203 for controlling the electric power converters 205-207 based on the voltage reference $U_{DC}$ ref and measured voltage values $U_{DC}$ meas1, $U_{DC}$ meas2, and $U_{DC}$ meas3. Each of the controllers 205-207 is provided with its own voltage measurement means to achieve redundancy between the units 219, 220, and 221. Each of the controllers 205-207 is configured to control the respective electric power converter at least partly based on a device-specific integral term which is maintained by the controller under consideration and which represents a time integral of a device-specific error signal that is indicative of a deviation of the measured voltage value from the voltage reference $U_{DC}$ ref. For example, the device-specific error signal related to the power converter 205 is: $U_{DC}$ ref −$U_{DC}$ meas1. In FIG. 2, the device-specific integral terms related to the electric power converters 205-207 are denoted as I1, I2, and I3, respectively. In the exemplifying case illustrated in FIG. 2, the "device-specific" means "power converter-specific" since the parallel operating devices are the power converters 205-207. The control system further comprises a stabilizing system for computing an arithmetic average of the device-specific integral terms I1, I2, and I3, and for correcting each of the device-specific integral terms towards the computed arithmetic average.

In the exemplifying control system illustrated in FIG. 2, the above-mentioned stabilizing system is implemented in a centralized way. The controllers 205-207 are communicatively connected to a central device 204 via a data transfer channel 218, e.g. a field bus. The central device 204 comprises a receiver 209 for receiving the device-specific integral terms I1, I2, and I3 via the data transfer channel 218. The central device 204 comprises an arithmetic section 210 for computing the arithmetic average of the device-specific integral terms, i.e. (I1+I2+I3)/3. The arithmetic section 210 is configured to correct each of the device-specific integral terms I1, I2, and I3 towards the computed arithmetic average. The arithmetic section 210 can be configured to correct the device-specific integral terms for example according to the formula 2 presented earlier in this document. The central device 204 further comprises a transmitter 211 for transmitting the corrected device-specific integral terms I1,corr, I2,corr, and I3,corr to the controllers 201-203.

The units 219, 220, and 221 can be peers to each other and thus redundancy is achieved because one of the units 219-221 can be removed from the device-system without actions from the other units. Correspondingly, a new unit can be added to the device-system without actions from the other units. If a unit is removed, its device-specific integral term does not participate to above-described average calculation anymore. Correspondingly, if a unit is added its device-specific integral term can be added automatically to the average calculation.

The implementation of each of the controllers 101-103 shown in FIG. 1a, as well as the implementation of each of the controllers 201-203 and the central device 204 shown in FIG. 2 can be based on one or more analogue circuits, one or more digital processing circuits, or a combination thereof. Each digital processing circuit can be a programmable processor circuit provided with appropriate software, a dedicated hardware processor such as for example an application specific integrated circuit "ASIC", or a configurable hardware processor such as for example a field programmable gate array "FPGA". Furthermore, each of the controllers 101-103 as well as each of the controllers 201-203 and the central device 204 may comprise one or more memory circuits each of which can be for example a Random-Access Memory "RAM" circuit.

Figure 3:
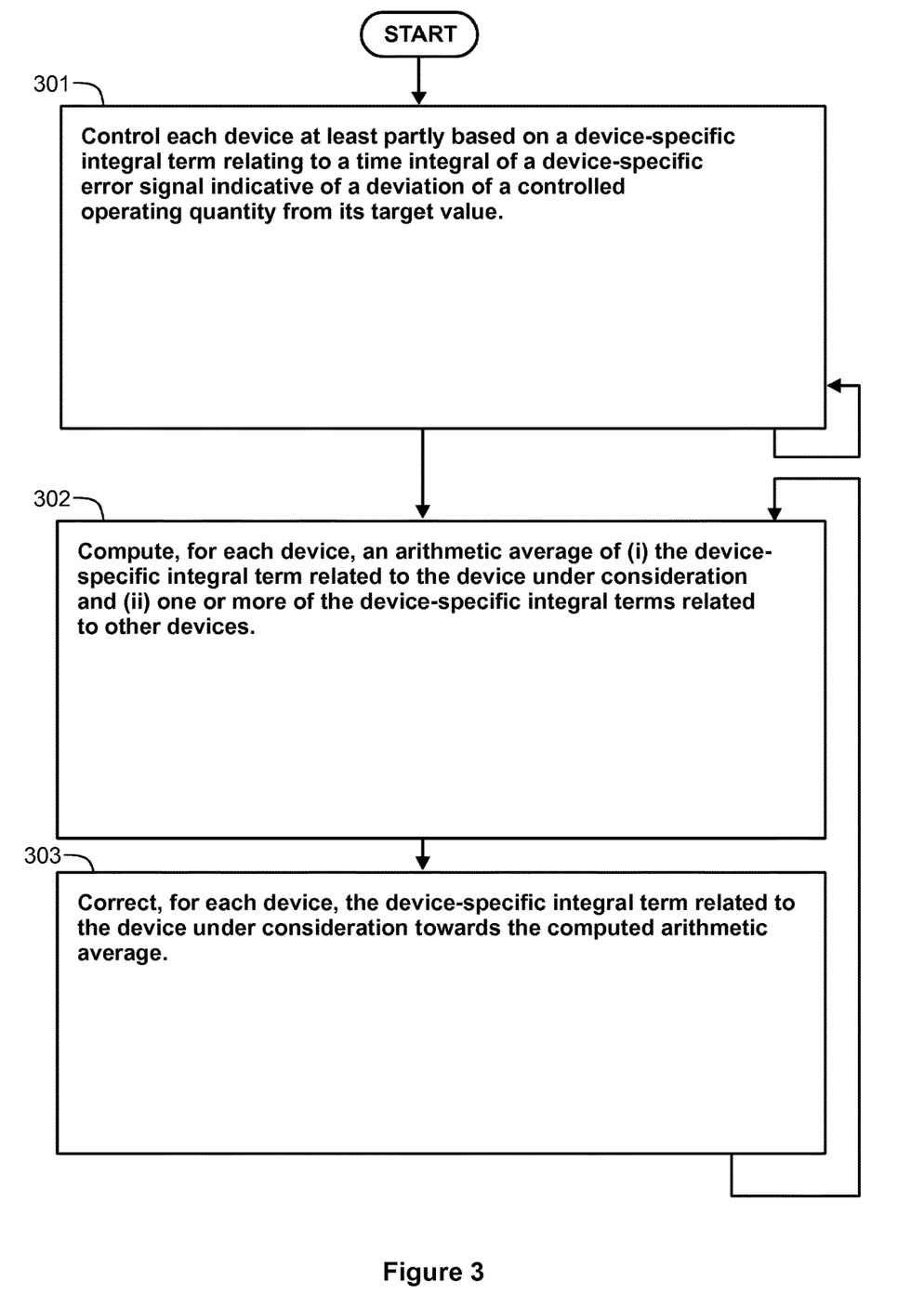
FIG. 3 is a flowchart of a method according to an exemplifying and non-limiting embodiment of the invention for controlling a device-system comprising parallel operating devices.

FIG. 3 shows a flowchart of a method according to an exemplifying and non-limiting embodiment of the invention for controlling an electric power system that comprises parallel operating devices configured to drive an operating quantity towards a target value. The method comprises action 301 which involves controlling each of the devices at least partly based on a device-specific integral term relating to a time integral of a device-specific error signal that is indicative of a deviation of the operating quantity from the target value. The method further comprises the following actions for each of the devices:
  action 302: computing an arithmetic average of (i) the device-specific integral term related to the device under consideration and (ii) one or more of the device-specific integral terms related to other ones of the devices, and
  action 303: correcting the device-specific integral term related to the device under consideration towards the computed arithmetic average.

In a method according to an exemplifying and non-limiting embodiment of the invention, the following actions are carried out at each of the devices:
  receiving the one or more of the device-specific integral terms related to the other ones of the devices,
  computing the arithmetic average of the received device-specific integral terms and the device-specific integral term related to the device under consideration, and
  correcting the device-specific integral term related to the device under consideration towards the computed arithmetic average.

A method according to an exemplifying and non-limiting embodiment of the invention comprises transmitting, from at least one of the devices to other ones of the devices, the device-specific integral term related to the at least one of the devices.

In a method according to an exemplifying and non-limiting embodiment of the invention, the device-specific integral terms are updated and corrected according to the formula:

$$I\_n = I\_n,\text{prev} + e\_n \Delta t / Ti + K\text{corr}(I\_\text{ave} - (I\_n,\text{prev} + e\_n \Delta t / Ti)),$$

where $I\_n$ is the device-specific integral term related to $n^{th}$ one of the devices, $I\_n,\text{prev}$ is the previous value of the device-specific integral term, $e\_n$ is the device-specific error signal related to the $n^{th}$ one of the devices, $I\_\text{ave}$ is the arithmetic average, $\Delta t$ is the temporal length of one operating clock cycle, $Ti$ is the integration time, and $K\text{corr}$ is a correction factor.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for stabilizing control of parallel operating devices configured to drive an operating quantity towards a target value, each of the devices being controlled at least partly based on a device-specific integral term relating to a time integral of a device-specific error signal indicative of a deviation of the operating quantity from the target value. The software modules comprise computer executable instructions for controlling a programmable processing system to:
  compute, for each of the devices, an arithmetic average of
    (i) the device-specific integral term related to the device under consideration and (ii) one or more of the device-specific integral terms related to other ones of the devices, and
  correcting the device-specific integral term related to the device under consideration towards the computed arithmetic average.

The software modules can be for example subroutines or functions implemented with programming tools suitable for the programmable processing system.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A control system for controlling parallel operating devices configured to drive an operating quantity towards a target value, the control equipment comprising controllers for controlling the devices so that each controller is configured to control one of the devices at least partly based on a device-specific integral term maintained by the controller under consideration and relating to a time integral of a device-specific error signal available to the controller and indicative of a deviation of the operating quantity from the target value, wherein the control system further comprises a stabilizing system for computing, for each of the controllers, an arithmetic average of (i) the device-specific integral term maintained by the controller under consideration and (ii) one or more of the device-specific integral terms maintained by other ones of the controllers, and for correcting the device-specific integral term maintained by the controller under consideration towards the computed arithmetic average, wherein the stabilizing system is implemented with the controllers so that each of the controllers comprises:

a receiver for receiving the one or more of the device-specific integral terms maintained by the other ones of the controllers, and an arithmetic section for computing the arithmetic average of the received device-specific integral terms and the device-specific integral term maintained by the controller under consideration, and for correcting the device-specific integral term maintained by the controller under consideration towards the computed arithmetic average.

2. The control system according to claim 1, wherein at least one of the controllers comprises a transmitter for transmitting, to other ones of the controllers, the device-specific integral term maintained by the at least one of the controllers.

3. The control system according to claim 2, wherein each of the controllers is configured to update and correct the device-specific integral terms according to the formula:

$$I\_n = I\_n,\text{prev} + e\_n\Delta t/Ti + K\,\text{corr}(I\_\text{ave} - (I\_n,\text{prev} + e\_n\Delta t/Ti)),$$

where $I\_n$ is the device-specific integral term maintained by $n^{th}$ one of the controllers, $I\_n,\text{prev}$ is the previous value of the device-specific integral term, $e\_n$ is the device-specific error signal related to the $nt^h$ one of the devices, $I\_\text{ave}$ is the arithmetic average, $\Delta t$ is a temporal length of one operating clock cycle, $Ti$ is an integration time, and $K\text{corr}$ is a correction factor.

4. The control system according to claim 2, wherein each of the controllers is a proportional and integrative "PI" controller or a proportional-integrative-derivative "PID" controller.

5. The control system according to claim 1, wherein each of the controllers is configured to update and correct the device-specific integral terms according to the formula:

$$I\_n = I\_n,\text{prev} + e\_n\Delta t/Ti + K\,\text{corr}(I\_\text{ave} - (I\_n,\text{prev} + e\_n\Delta t/Ti)),$$

where $I\_n$ is the device-specific integral term maintained by $n^{th}$ one of the controllers, $I\_n,\text{prev}$ is the previous value of the device-specific integral term, $e\_n$ is the device-specific error signal related to the $n^{th}$ one of the devices, $I\_\text{ave}$ is the arithmetic average, $\Delta t$ is a temporal length of one operating clock cycle, $Ti$ is an integration time, and $K\text{corr}$ is a correction factor.

6. The control system according to claim 1, wherein each of the controllers is a proportional and integrative "PI" controller or a proportional-integrative-derivative "PID" controller.

7. A device-system comprising:
parallel operating devices for driving an operating quantity towards a target value, and a control system according to claim 1 for controlling the parallel operating devices.

8. The device-system according to claim 7, wherein the parallel operating devices are mechanically coupled electric machines whose rotational speeds have fixed relations with respect to each other, and the operating quantity has a fixed relation with the rotational speeds of the mechanically coupled electric machines.

9. The device-system according to claim 7, wherein the parallel operating devices are electric power converters supplying a common direct voltage link, and the operating quantity is direct voltage of the common direct voltage link.

10. A plurality of controllers for controlling a plurality of devices, each device being one of parallel operating devices configured to drive an operating quantity towards a target value, each controller of the plurality of controllers comprising:

a control section for controlling the device at least partly based on a device-specific integral term maintained by the control section and relating to a time integral of a device-specific error signal available to the controller and indicative of a deviation of the operating quantity from the target value, wherein each controller of the plurality of controllers further comprises:

a receiver for receiving one or more of device-specific integral terms related to other ones of the parallel operating devices, and an arithmetic section for computing an arithmetic average of: (i) the received device-specific integral terms, and (ii) the device-specific integral term maintained by the control section, and for correcting the device-specific integral term maintained by the control section towards the computed arithmetic average.

11. The controller according to claim 10, wherein the controller comprises a transmitter for transmitting, to a data transfer channel, the device-specific integral term maintained by the control section.

12. A method for controlling parallel operating devices configured to drive an operating quantity towards a target value, the method comprising:

controlling each of the devices at least partly based on a device-specific integral term relating to a time integral of a device-specific error signal indicative of a deviation of the operating quantity from the target value, wherein the method comprises the following actions for each of the devices:

receiving one or more of the device-specific integral terms related to other ones of the devices, computing an arithmetic average of (i) the device-specific integral term related to the device under consideration and (ii) the one or more of the device-specific integral terms related to other ones of the devices, and correcting the device-specific integral term related to the device under consideration towards the computed arithmetic average.

13. The method according to claim 12, wherein the device-specific integral terms are updated and corrected according to the formula:

$$I\_n = I\_n,\text{prev} + e\_n\Delta t/Ti + K\,\text{corr}(I\_\text{ave} - (I\_n,\text{prev} + e\_n\Delta t/Ti)),$$

where $I\_n$ is the device-specific integral term related to $n^{th}$ one of the devices, $I\_n,\text{prev}$ is the previous value of the device-specific integral term, $e\_n$ is the device-specific error signal related to the $n^{th}$ one of the devices, $I\_\text{ave}$ is the arithmetic average, $\Delta t$ is a temporal length of one operating clock cycle, Ti is an integration time, and Kcorr is a correction factor.

14. A non-volatile computer readable medium encoded with a computer program for stabilizing control of parallel operating devices configured to drive an operating quantity towards a target value, wherein the computer program comprises computer executable instructions for controlling a plurality of controllers of a programmable processing system to:

receive one or more of the device-specific integral terms related to other ones of the devices, control each of the devices at least partly based on a device-specific integral term relating to a time integral of a device-specific error signal indicative of a deviation of the operating quantity from the target value, compute, for each of the devices, an arithmetic average of (i) the device-specific integral term related to the device under consideration and (ii) the one or more of the device-specific integral terms related to other ones of the devices, and correcting the device-specific integral term related to the device under consideration towards the computed arithmetic average.

* * * * *

UNITED STATES PATENT AND TRADEMARK OFFICE
CERTIFICATE OF CORRECTION

PATENT NO. : 11,429,074 B2
APPLICATION NO. : 16/963966
DATED : August 30, 2022
INVENTOR(S) : Antti Tarkiainen, Risto Tiainen and Matti Iskanius It is certified that error appears in the above-identified patent and that said Letters Patent is hereby corrected as shown below:

In the Claims

Column 11, Claim 3, Line 41, "$nt^h$" should read --$n^{th}$--.

Signed and Sealed this
Sixth Day of December, 2022

Katherine Kelly Vidal
*Director of the United States Patent and Trademark Office*